Figure 1:
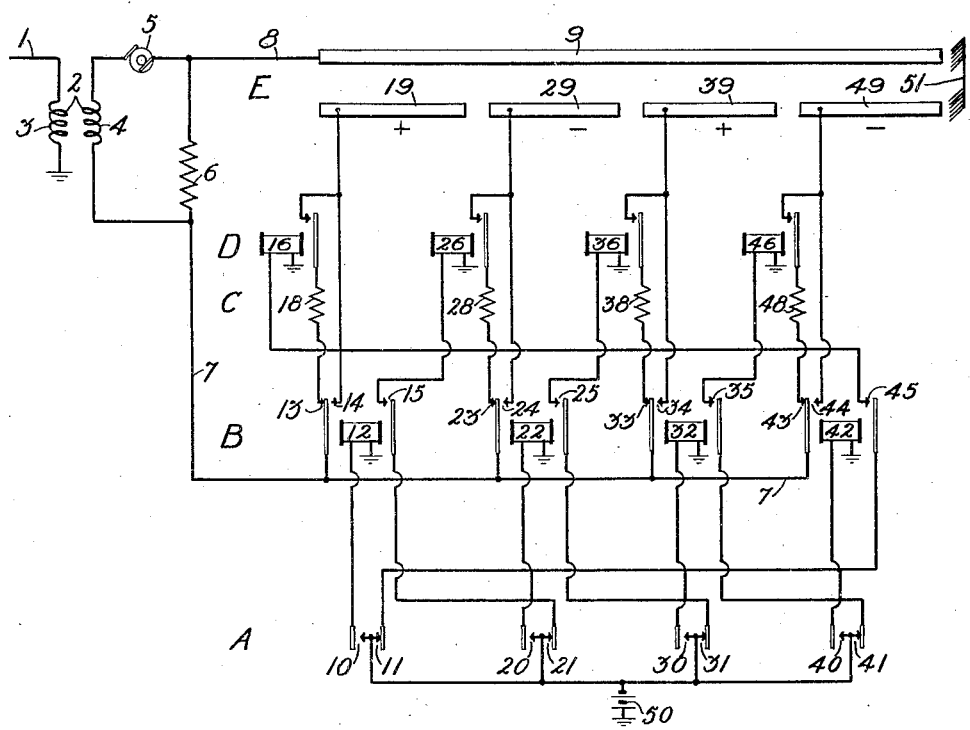

J. H. BELL.
TELEGRAPH SYSTEM.
APPLICATION FILED NOV. 22, 1917.

1,360,713.

Patented Nov. 30, 1920.

Inventor:
John H Bell

UNITED STATES PATENT OFFICE.

JOHN H. BELL, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

1,360,713.

Specification of Letters Patent.

Patented Nov. 30, 1920.

Application filed November 22, 1917. Serial No. 203,353.

*To all whom it may concern:*

Be it known that I, JOHN H. BELL, a citizen of the United States, residing at South Orange, in the county of Essex and State of New Jersey, have invented certain new and useful Improvements in Telegraph Systems, of which the following is a full, clear, concise, and exact description.

This invention relates to telegraph systems, and more particularly to submarine telegraphy.

The principal object of this invention is to provide an improved organization of apparatus for overcoming the phenomenon known as "wandering zero" experienced in line conductors having high electrostatic capacity.

The invention is more particularly applicable to a system in which an uninterrupted alternating current, preferably of sine wave form is impressed on a cable, the message impulses being in the form of augmented waves of either positive or negative polarity, that is, half-waves of increased amplitude.

In such systems, when two or more augmented half-waves of positive polarity, for example, are separated by negative half-waves of normal amplitude, there results a cumulative charge on the cable which manifests itself as an apparent shifting of the zero line so that in the case in question, the current at the receiving end of the cable instead of alternating from positive to negative might appear simply as a fluctuating positive current.

With some forms of receiving devices, such, for example, as the siphon recorder, it is possible to read such distorted signals without much difficulty. When, however, an automatic recording of the signals is desired, as in printing telegraphy, it becomes necessary to employ marginal receiving devices to differentiate between augmented half-waves and normal half-waves. In such cases it follows that, if the distortion of signals above mentioned is not corrected or compensated for in some way, the operation of such marginal devices may be seriously interfered with.

The present invention provides a transmitting system which automatically compensates for such distortion. A plurality of electroresponsive switching devices under the control of other transmitting devices establish circuits whereby, in accordance with a predetermined arrangement, certain half-wave impulses of minimum strength are augmented in such a manner that they will rise to their true potential value in opposition to decrementing effects which would be present due to inverse half-waves of maximum strength.

This invention is illustrated diagrammatically in the accompanying drawing, in which only so much of a telegraph equipment is shown as will be necessary to a clear understanding of the system.

Figure 2:
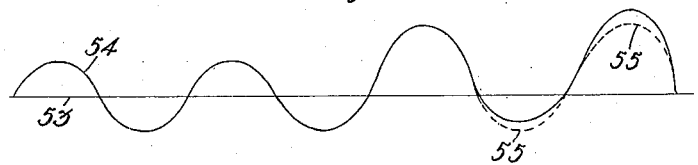

In the drawing, Figure 1 illustrates a transmitting equipment suitable for practising the features of this invention. In Fig. 2 are shown curves which represent various amplitudes of the wave currents in a submarine cable.

In describing this system, a main line or cable indicated by the reference character 1 is connected through a winding 3 of a current transformer 2 to an earth connection. A generator 5 capable of creating single phase alternating currents of sine-wave form is connected in a closed series loop which includes a second winding 4 of the transformer 2 and a resistance unit 6. From a point intermediate the unit 6 and the generator 5, a conductor 8 extends to a collector ring 9 of a distributer E, which may be of any suitable type, but which for convenience has been shown in a development view in the drawing. From a point on the loop-circuit intermediate the resistance 6 and the winding 4 of the transformer, a bus-conductor 7 connects common to a contacting armature on each one of four relays forming a group B. At A is shown a group of four sets of transmitting contacts which may be considered as under the control of a punched tape (not shown). The transmitting contacts A control the operation of the relays B which act in conjunction with the distributer E to short-circuit the resistance unit 6 in order to increment half-waves of current from the generator 5. The relays B also control the operation of four relays comprising a group D and these relays act jointly with the distributer E in bridging resistance units indicated as a group C, on the resistance unit 6, in order that the generator 5 may develop half-waves of current incremented sufficiently to overcome residual cable charge of inverse polarity in order that such impulses may rise to a predetermined minimum strength.

Briefly described, this system provides that during such time as the transmitter equipment is in its normal position, as shown in the drawing, the generator 5 will develop wave-currents of symmetrical form and a minimum strength in the closed loop circuit and through the transformer 2 these currents will be translated into the cable 1. The transmitter contacts at A selectively control operation of relays in the group B whereby a bus-conductor 7 will be connected through substantially zero resistance circuits to corresponding segments of the distributer E, and at the moment a brush 51 of the distributer passes over such segments they will be joined to the collector-ring 9 to complete a short circuit on the resistance unit 6. The brush 51 travels in such relation to the speed of the generator 5 that a half-wave of current will rise and fall during the time the brush is traversing a segment, and at the zero current moments between impulses from the generator 5, the brush 51 will be traversing a point intermediate two segments. It will, therefore, be clear that in phase with a short circuit established on the unit 6 an alternation of maximum strength would be developed by the generator 5, and a current of similar strength would, therefore, be translated by the transformer 2 into the line 1. When a code combination of impulses is such that an alternation of maximum strength will be followed by an inverse alternation of normal or minimum strength, a corresponding relay of the group D will operate to establish an associated one of the resistances in the group C from the bus-conductor 7 to the proper segment of the distributer, and on the brush 51 arriving over such segment, the last mentioned resistance unit will be established in parallel with the resistance unit 6 of the generator loop-circuit. Under this condition, the generator 5 would accordingly develop an incremented half-wave current of an intermediate strength in its closed circuit whereby a half-wave current of corresponding strength would be induced in the cable 1 and thereby more nearly neutralize or overcome the asymmetrical current effect which would otherwise result from the preceding alternation of greater strength.

In more specifically describing the features of the present system, let it be assumed that in response to a code combination of perforations in the tape, which has already been assumed as present at the transmitter A, normal contacts 11, 21 and 41 will remain closed, while normal contacts 31 will be opened and the corresponding forward contacts 30 will be closed. The latter contacts complete a circuit which may be traced from a grounded battery 50 through the winding of a relay 32 to earth. In response to this current, the relay 32 separates its contacts 33 and closes its contacts 34 and 35. Through the contacts 34 a connection is prepared from the bus-conductor 7 to a segment 39 of the distributer. The contacts 35 complete a circuit which may be traced from the battery 50 over the transmitter contacts 41, contacts 35 of the relay 32 and the winding of a relay 46 to earth. Operation of the latter relay prepares a circuit which may be traced from the bus-conductor 7 by way of the contacts 43 of a relay 42, a resistance unit 48, and the contacts of the relay 46 to a segment 49 of the distributer. Since the brush 51 of the distributer travels in phase with the armature of the generator 5, it will be obvious that for an equal number of segments the polarity of half-wave currents will always be the same at a given segment. For convenience of description, a certain polarity relation has been assumed and the segments 19, 29, 39 and 49 have been so marked, beginning with positive at the first segment. For the present assumed position of the transmitter equipment, on the brush 51 arriving over the segment 19, it will be seen that the full value of the resistance unit 6 will be effective in the generator circuit, since one connection extending from the segment 19 stands open at the contacts of the relay 16, while a second connection stands open at the contacts 14 of the relay 12. Therefore, during the time the brush 51 is passing over this segment a positive impulse of normal or minimum strength will be impressed upon the cable 1. At the segment 29, the relays 22 and 26 being in their normal position, open circuit conditions similar to those described from the segment 19 result in a negative alternation of normal strength being impressed by the generator 5 on the cable 1. On arriving over the segment 39 the circuit, prepared as already traced from the bus-conductor 7, is completed to the ring 9, thereby short-circuiting the resistance unit 6, whereupon the generator 5 develops a positive impulse of maximum strength in the loop circuit and, accordingly, in the cable 1. At the segment 49, the brush 51 completes to ring 9 the circuit prepared from the bus-conductor 7 through the resistance unit 48, thereby establishing this resistance in bridge on the resistance 6; accordingly, the generator 5 will develop a negative half-wave of current incremented in such a manner that after overcoming the residual charge in the cable due to the preceding positive impulse of maximum strength it will rise to its normal predetermined minimum strength.

From the foregoing description it will be clear that in the group D, the relay 16 is jointly controlled by the transmitter contacts 11 and the contacts 45 of the relay 42 in the group B, and in a similar manner the relays 26, 36 and 46 are respectively controlled by corresponding transmitter contacts 21, 31 and 41, and contacts 15, 25 and 35 of the relays 12, 22 and 32 respectively. Also that the relays 12, 22, 32 and 42 respectively prepare zero-resistance circuits from the bus-conductor 7 to the segments 19, 29, 39 and 49 in order that half-wave currents of a predetermined maximum strength may be impressed upon the cable 1, and as the control of each relay in the group D is typical one of another, it will further be obvious that in augmenting normal non-signaling half-waves of current in order to counteract a decrementing effect of half-waves of maximum strength, contacts of the relays 16, 26, 36 and 46 respectively, control the preparation of circuits from the bus conductor 7 through resistance units 18, 28, 38 and 48 to associated ones of the segments 19, 29, 39 and 49.

Referring to Fig. 2 of the drawing, the line 53 indicates the zero-phase-angle of wave currents indicated by a wave line 54 which may be assumed as representing alternating currents in a telegraph cable. Reading this curved line from left to right, it will be clear that two positive impulses of normal strength are separated by a negative impulse of similar strength, and a fourth negative impulse of normal strength is followed by two positive impulses of incremented strength, the latter impulses being separated by a negative impulse of normal strength. For the sixth and seventh impulses, the shadow line indicates how the sixth or normal impulse would be weakened or decremented, due to the effect of the preceding fifth or positive impulse, while for the seventh impulse the potential would be increased beyond the maximum strength to which it is expected to rise. The dotted line 55 indicates a correction of the sixth impulse due to the incrementing effect established by the present invention, and for the impulse 7 the same line indicates a correction which would accordingly result for this impulse.

For convenience of description, the equipment shown has been arranged to occupy the entire capacity of a distributer, which should preferably be of a rotary type, in which the segments would be in the form of a ring with the segment 49 falling adjacent the segment 19. Therefore, in preparing an impulse correcting circuit for a half-wave of maximum potential from the segment 49, the relay 42 controls the correcting relay 16 of the segment 19. A service arrangement, however, would require that in case the equipment shown was associated with a single arm or quadrant on a quadruplex distributer or one sextant of a sextuplex distributer, instead of the interconnections between the first and last segment equipment of such arm being present, the equipment of the last segment would progress ahead to corresponding points on similar equipment of a first segment in the next quadrant or arm. The interconnections would, therefore, progress from segment to segment equipment through and between the different quadrants until a complete ring would be formed to the equipment of the first segment in the present section or arm of a distributer.

What is claimed is:

1. In a telegraph system, means for transmitting message impulses and non-message impulses, and means controlled in said transmitting of message and non-message impulses for automatically incrementing predetermined ones of said non-message impulses.

2. In a telegraph system, means for transmitting message impulses and non-message impulses, and means controlled in said transmitting of message and non-message impulses for automatically incrementing those of said non-message impulses which have polarities inverse to the polarities of said message impulses.

3. In a telegraph system, means for transmitting current impulses, means for incrementing predetermined ones of said impulses to effect signaling, and means controlled in said incrementing of predetermined ones of said impulses for automatically incrementing predetermined ones of said impulses which are not employed for signaling.

4. In a telegraph system, a line circuit, a source of alternating current to establish current effects not employed for signaling in said line circuit, means for varying the amplitude of half-wave intervals of said current to effect signaling, and means for incrementing predetermined ones of said half-wave intervals which are not employed for signaling.

5. In a telegraph system, a line circuit, a source of symmetrical alternating currents included therewith, means for rendering said currents asymmetrical to effect signaling and means controlled by said means for rendering said currents asymmetrical for incrementing the last half period of an asymmetrical alternating current wave.

6. In a telegraph system, a line circuit, a source of alternating current employed as non-signaling current in energizing said line circuit, means for selectively incrementing half-wave intervals of said current to effect signaling, and means for incrementing predetermined half-waves of said alternating current employed as non-signaling currents.

7. In a telegraph system, a line circuit, a source of current waves, means for including said source of current waves with said line to establish effects not employed for signaling therein, a current modifying means, means for rendering said current modifying means effective to vary the amplitude of said currents to effect signaling, other current modifying means, and means for rendering said other current modifying means effective to increment predetermined half-waves of said currents not employed for signaling.

8. In a telegraph system, a line circuit, a source of symmetrical alternating current to produce electrical effects not employed for signaling in said line circuit, a current modifying means, means for establishing said current modifying means effective to selectively render said currents asymmetrical to effect signaling, other current modifying means, and means to render said other current modifying means effective to increment predetermined half-waves of said current not employed for signaling.

9. In a telegraph system, a line circuit, a transformer included therewith, a source of wave currents to act through said transformer in energizing said line circuit with currents not employed for signaling, current reducing means included with said transformer, means for selectively controlling the operative condition of said current reducing means in phase with said wave-currents to effect signaling, and means for selectively incrementing predetermined ones of said wave-currents not employed for signaling.

10. In a telegraph system, a line circuit, a source of alternating current included therewith, a substantially zero resistance circuit, a plurality of selectable contacts, a plurality of first relays controlled by said contacts, a distributer coöperating with said relays to render said substantially zero resistance circuit effective to vary the amplitude of half-wave intervals of said alternating current to effect signaling, a plurality of resistances, a second plurality of relays controlled by said first relays to control said plurality of resistances to increase the amplitude of non-message half-waves of said current.

11. In a telegraph system, a line circuit, a source of symmetrical current waves included therewith, means for selectively rendering said waves asymmetrical to effect signaling, potential modifying means, and electroresponsive means controlled by said means for establishing said asymmetrical effects to control said potential modifying means for varying the form of said asymmetrical waves to affect the zero current condition of said line circuit.

12. In a telegraph system, a line circuit, a source of alternating current included therewith, potential modifying means in circuit with said source, a plurality of selectable contacts, a first plurality of relays controlled by said contacts, a distributer coöperating with said relays to control the operativeness of said potential modifying means, means to vary the form of wave intervals of said current to effect signaling, other potential modifying means, a second plurality of relays controlled by said first plurality of relays to operatively control said other potential modifying means, and means to further vary the form of said wave intervals.

13. In a telegraph system, a source of wave currents included therewith, a plurality of selectable contacts, a plurality of first relays controlled by said contacts, a plurality of second relays controlled in a predetermined order by said first relays, a distributer, substantially zero-resistance circuits controlled by said first relays and said distributer to selectively vary the form of single wave intervals, and a plurality of resistances controlled by said second relays to further vary the amplitude of said single wave intervals of current.

14. The method of telegraphic transmission wherein signaling is effected by means of incremented half-wave intervals of an unbroken alternating current, the incrementing of the inverse half-waves of said signaling current intervals to reduce wandering zero effects in a line conductor.

15. The method of transmitting signals in telegraphy in which signaling is effected through establishing asymmetrical waves in an unbroken alternating current, which consists in further varying the form of said asymmetrical waves in order to modify a wandering zero effect of said alternating currents.

16. In a telegraph system, a source of unbroken symmetrical alternating currents, a line circuit included with said source of currents, a plurality of selectable contacts, a plurality of relays controlled by said selectable contacts, a distributer, substantially zero resistance circuits controlled by said relays and said distributer for rendering said currents asymmetrical to effect signaling, a second plurality of relays jointly controlled by said selectable contacts and said first mentioned relays, and resistances jointly controlled by said first and second mentioned relays and said distributer to modify the wave intervals of said currents in order to affect the zero potential phase-angle of said wave currents in said line.

17. The method of transmitting signals in telegraphy wherein a continuous current is sent out by the transmitting station and wherein the various impulses of a message are formed by altering the amplitude of predetermined half-waves of said alternating current, which consists in preventing a wandering zero by altering in kind the half-wave immediately succeeding each said message impulse.

18. The method of transmitting signals in telegraphy wherein a continuous alternating current is sent out by the transmitting station and wherein the various impulses of a message are formed by altering the amplitude of predetermined half-waves of said alternating current, which consists in preventing a wandering zero by altering but to a less degree the amplitude of a non-message half-wave succeeding a message half-wave.

19. In a system of electric signaling wherein a continuous alternating current is sent out by the transmitting station and wherein the various impulses of a message are formed by increasing the amplitude of predetermined half waves of said alternating current, the method of preventing a wandering zero which consists in increasing to a less degree the amplitude of a non-message half-wave immediately following one of said message half-waves.

20. The method of transmitting signals in telegraphy wherein a continuous alternating current is sent out by the transmitting station and wherein the various impulses of a message are formed by increasing the amplitude of predetermined half-waves of said alternating current, which consists in preventing a wandering zero by increasing the amplitude of the half-wave immediately succeeding each said message impulse.

In witness whereof, I hereunto subscribe my name this 20th day of November, A. D. 1917.

JOHN H. BELL.